United States Patent [19]

Wakeman

[11] Patent Number: 4,796,580
[45] Date of Patent: Jan. 10, 1989

[54] IDLE CONTROL VALVE FOR USE WITH A THROTTLE ASSEMBLY OF AN INTERNAL COMBUSTION ENGINE

[75] Inventor: Russell Wakeman, Newport News, Va.

[73] Assignee: Allied-Signal Inc., Morris Township, Morris County, N.J.

[21] Appl. No.: 95,085

[22] Filed: Sep. 11, 1987

[51] Int. Cl.[4] .............................................. F02M 3/00
[52] U.S. Cl. ...................... 123/339; 123/56 R; 251/248
[58] Field of Search ............ 251/248, 129.11, 129.05; 123/339; 192/56 R

[56] References Cited

U.S. PATENT DOCUMENTS

| | | | |
|---|---|---|---|
| 1,671,521 | 5/1928 | Fisher | 192/56 R |
| 2,544,809 | 3/1951 | Stanley | 192/56 R |
| 4,212,272 | 7/1980 | Hawk | 123/339 |
| 4,280,471 | 7/1981 | Masaki | 123/339 |
| 4,289,100 | 9/1981 | Kinugawa et al. | 123/339 |
| 4,369,755 | 1/1983 | Saito | 123/339 |
| 4,412,517 | 11/1983 | Kobashi et al. | 123/339 |
| 4,418,666 | 12/1983 | Yamauchi et al. | 123/339 |
| 4,421,083 | 12/1983 | Stoltman | 123/339 |
| 4,452,261 | 6/1984 | Mazur | 123/339 |
| 4,480,614 | 11/1984 | Kobashi | 123/339 |
| 4,519,369 | 5/1985 | Kitamura | 123/339 |
| 4,538,570 | 9/1985 | Lunt | 123/339 |
| 4,539,955 | 9/1985 | Wilson | 123/339 |

Primary Examiner—Raymond A. Nelli
Attorney, Agent, or Firm—Nixon & Vanderhye

[57] ABSTRACT

Idle control valve for use with a throttle assembly of an internal combustion engine includes a valve body, and a valve spool mounted within the valve body so as to be rotatable in opposite directions about an axis common to the valve spool and body. The valve spool includes a valve port defining an effective area which establishes the amount of air flow through the valve body between the air inlet and outlet thereof. Upon rotation of the valve spool by suitable drive structure (as by a DC motor receiving command signals from an engine control unit), the effective area of the valve port will be altered thereby responsively controllably altering the amount of air flowing through the valve body between its inlet and outlet. A clutch assembly precludes the transmission of torque to the valve spool above a predetermined threshold level (as by the valve spool reaching maximum or minimum positions) so that relative slippage occurs between the valve spool and the structure driving same.

16 Claims, 3 Drawing Sheets

IDLE CONTROL VALVE FOR USE WITH A THROTTLE ASSEMBLY OF AN INTERNAL COMBUSTION ENGINE

FIELD OF THE INVENTION

This invention relates generally to valving structures particularly useful in combination with internal combustion engines to variably control the amount of air introduced into the engine's throttle bore so as to thereby compensate for increased/decreased air demands of the engine during idling.

BACKGROUND OF THE INVENTION

Internal combustion spark ignition engines require varying amounts of air so as to idle properly under various operating conditions. As examples, (1) an increased amount of air is required when an engine is idling "cold" as compared to the amount of air required for proper idling of a "warm" engine; (2) an extra amount of air for emission reasons is required under conditions of deceleration, and (3) the amount of air flow must be varied so as to maintain relatively constant idle speed when loads on the engine (such as air conditioning compressors, alternators, etc.) are cycled.

Internal combustion engines have become increasingly more sophisticated with the use of microprocessor-based engine control units (ECU). For example, the ECU may typically receive data corresponding to engine temperature, engine speed, manifold pressure, oxygen content in exhaust gases as well as other conditions, for example, closed throttle (i.e. full choke) conditions on start up and the like. This data is then assimilated by the ECU and is used for various purposes, one of which is to operate conventional idle control assemblies, such as those represented by U.S. Pat. No. 4,539,955 issued to Robert E. Wilson et al on Sept. 10, 1985, and U.S. Pat. No. 4,212,272 issued to Rufus L. Hawk on July 15, 1980, each being entitled "Idle Speed Control Device for Internal Combustion Engine".

According to these prior idle control assemblies, the signals are received fron the ECU in the form of reverse polarity DC voltages so as to actuate a motor which, in turn, increases/decreases the length of a shaft having an end in contact with the throttle valve linkage. These types of devices, therefore depend upon automatic opening and closing of the throttle valve—that is, the throttle valve itself is opened (or closed) in dependence upon the operating conditions of the engine sensed by the ECU. While this functioning may be adequate for some engine operating conditions (such as "cold" engine operation), it cannot function as a means for controlling the quantity of air introduced into a throttle bore independently of the particular throttle valve setting.

Another conventional air control valve is disclosed in U.S. Pat. No. 4,369,755 issued to Masaaki Saito on Jan. 25, 1983, entitled "Air Control Device". This prior control valve is positioned in an air passage bypassing the throttle valve and thus operates independently thereof. A D.C. motor is connected to an inner cylindrical body in such a way that the latter can be rotated by the former. Rotation of the inner cylindrical body relative to an outer cylindrical body thus controls the amount of air flowing through the air passage bypassing the throttle. No means are disclosed in U.S. Pat. No. 4,369,755 however, which mechanically "decouples" the D.C. motor and the inner cylindrical body in response to a threshold torque being exceeded. Thus, the provision of a rotation angle sensor and a motor disabling circuit appear to be requirements of the valve of U.S. Pat. No. 4,369,755 during use since damage to the motor and/or inner cylindrical body could ensue without such electronic safeguards when the inner cylindrical body achieves its maximum (minimum) rotational position.

A balanced dual valve air flow regulator is disclosed in U.S. Pat. 4,421,083 issued to Donald D. Stoltman on Dec. 20, 1983, entitled "Engine Air Flow Regulator". According to this prior patent, the ECU varies the duty cycle of a solenoid so as to correspondingly vary air flow past valve seats until pressure on one side of a diaphragm balances the diaphragm force with the bias of the solenoid. In such a manner, air flow control through a throttle bypass control may be accomplished independently of throttle position.

SUMMARY OF THE INVENTION

In accordance with the present invention, an idle control valve is described and claimed whereby the amount of air supplied to a throttle assembly of an internal combustion engine is accomplished independently of the throttle valve setting. A valve body of generally cylindrical configuration is provided having an inlet so as to admit air into the interior of the valve body and an air outlet (Preferably in the form of a generally circular array of openings) to discharge air from the valve body and into the throttle bore of a throttle assembly of an internal combustion engine. A valve spool is rotatably mounted within the valve body and includes a valve port which defines an effective area so to establish the amount of air flow through the valve body between its inlet and outlet thereof. The valve spool is rotatable about an axis which is common to the spool and the body and is driven, for example, by a suitable DC motor which receives its signals in the form of reverse polarity DC voltages from an ECU so as to rotate the valve spool which, in turn, alters the effective area of the spool's valve port. In such a manner, the amount of air flowing through the valve body between its inlet and outlet is controllably altered so as to compensate during idling for varying engine operating conditions sensed by the ECU independently of the particular throttle valve setting.

Driven engagement between the motor and the valve spool is preferably effected by means of a worm/worm gear arrangement which transmits torque to the valve spool via a clutch assembly. The clutch assembly, in a preferred form, includes a pair of spherical detent members (slidably received within a transverse bore of a male portion of the worm gear) and a splined surface on an interior adjacent portion of the valve spool. A compression spring, or other like biasing means, acts upon the pair of spherical detent members so as to urge the same into engagement with respective splines of the splined surface.

When the maximum (minimum) extent of rotation has been achieved by the valve spool so as to create the maximum (minimum) effective area of the valve port defined thereby, a predetermined threshold torque level will be exceeded thereby causing the detent members to retract into the transverse bore and thus allow relative slippage to occur between the male portion of the worm gear on the one hand, and the splined surface of the valve spool on the other hand. This relative slippage or "ratcheting" permits the motor to continue operation without damage to either the worm/worm gear arrangement or the valve spool. However, when the worm gear reverses rotation upon receipt of a DC voltage signal of a polarity reverse to that which caused the spool to rotate into its maximum (minimum) position, the detent members will again be seated within respective splines (since the transmitted torque will again be below the threshold torque) and, thus, the valve spool will be caused to rotate in an opposite direction.

The structures of the present invention, therefore, are relatively simple in view of prior art proposals and allows the amount of air to be controllably altered independently of the throttle valve of an internal combustion engine. Moreover, the structures of this invention avoid the necessity of complicated motor-disabling and/or valve spool position sensing systems typical of prior art proposals. These and other advantages of the invention will become more apparent to those skilled in this art after careful consideration is given to the detailed description of the preferred exemplary embodiment thereof which follows.

BRIEF DESCRIPTION OF THE DRAWINGS

Reference will hereinafter be made to the accompanying drawings wherein like reference numerals throughout the various Figures denote like structural elements, and wherein.

DETAILED DESCRIPTION OF THE PREFERRED EXEMPLARY EMBODIMENT

Figure 1:
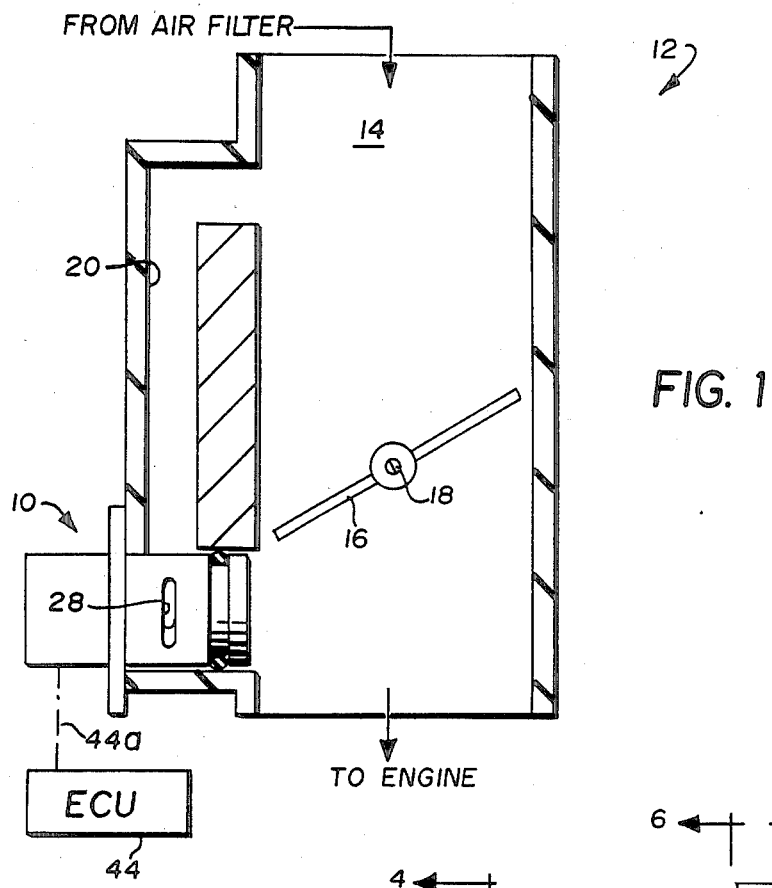
FIG. 1 is a schematic view of a throttle assembly for an internal combustion engine showing the idle valve of this invention operatively associated therewith.

The idle valve 10 of this invention is schematically depicted in FIG. 1 as being installed as part of a throttle assembly 12 of an internal combustion engine (not shown). In a well known manner, the throttle assembly defines a throttle bore 14 in which a throttle valve 16 is pivotally mounted via its shaft 18. The shaft 18 is, in turn, connected to an acceleration pedal (not shown) on the driver's side of the vehicle via suitable linkage structures. As is notoriously well known, opening (closing) of the throttle bore by causing the throttle valve to pivot to a more (less) open position (when the driver depresses (releases) the accelerator) causes an increase (decrease) in the engine operating torque. The engine with which the idle valve 10 of this invention may be utilized can be of any well known variety, e.g., carbureted or fuel injected (either a single point type wherein the injectors are located in the throttle assembly upstream of the throttle valve, or a multipoint type wherein a fuel injector is located near the intake valve of each engine cylinder).

In accordance with this invention, an air bypass 20 is provided in assembly 12 such that an amount of air (controlled via idle valve 10) is introduced downstream of throttle valve 16. Since no linkage between idle valve 10 and throttle valve 16 is present, the idle valve 10 is able to control the amount of air introduced into bore 14 downstream of throttle valve 16 independently of the latter. Thus, while the "idle position" of the throttle valve may remain constant, the air demands of the engine during various operating conditions during idling may be compensated for by means of the bypass 20 and idle control valve 10.

Figure 2:
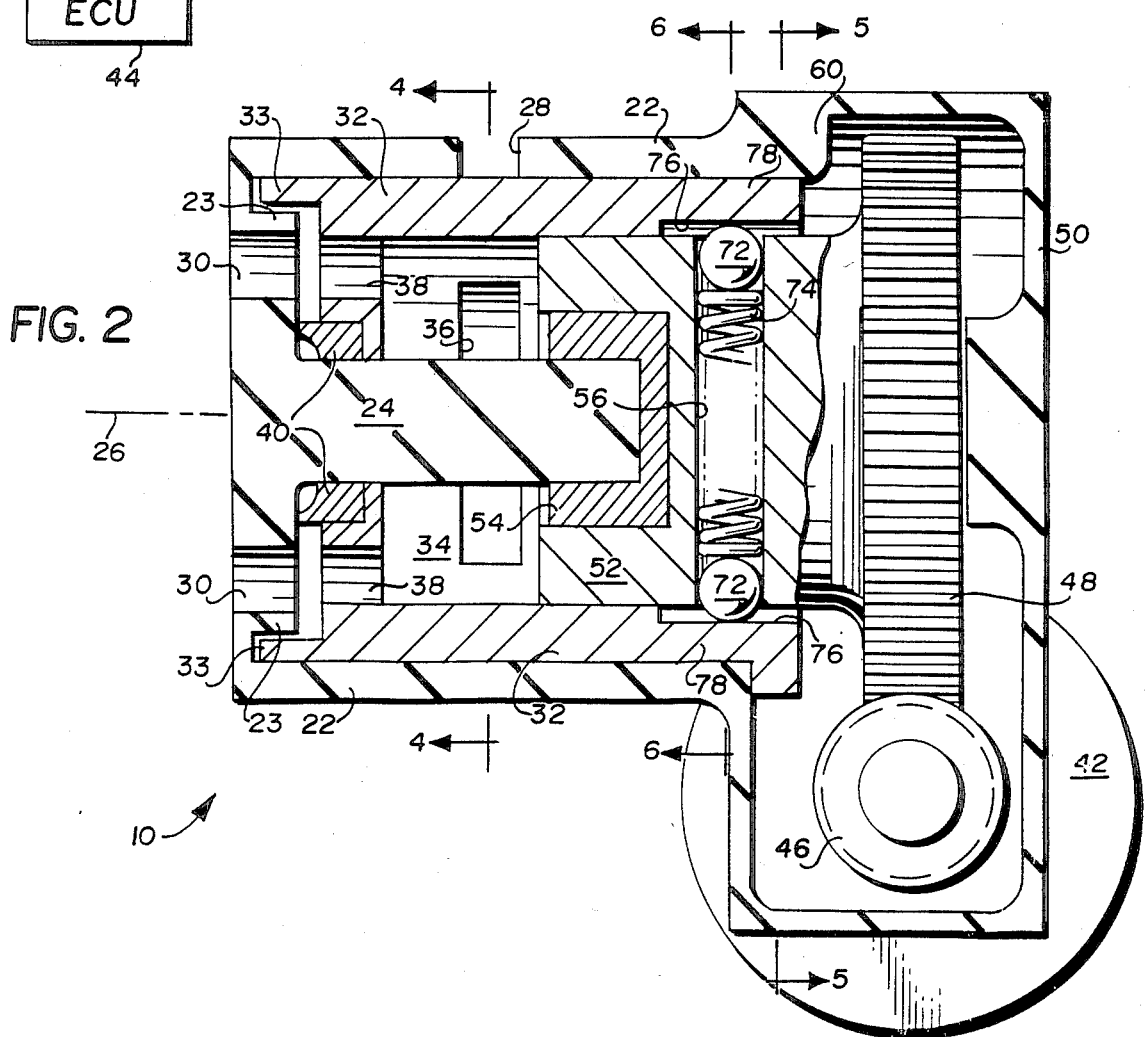
FIG. 2 is a cross-sectional side elevational view of the idle valve of this invention taken along line 2—2 in FIG. 3.
Figure 3:
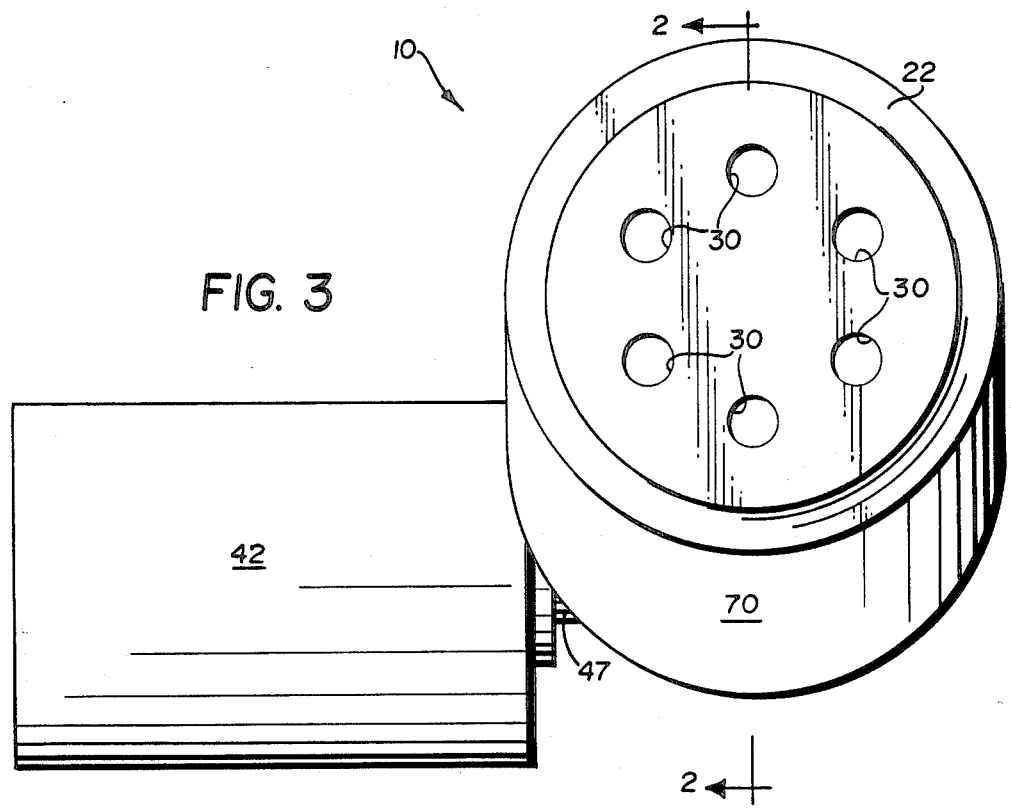
FIG. 3 is a is an end elevational view of the idle valve of this invention.

The idle control 10 of this invention is shown more specifically in accompanying FIGS. 2 and 3. As is seen, the idle valve 10 includes a generally cylindrical valve body 22 having a bearing post 24 inwardly extending along the valve's longitudinal axis 26. An air inlet slot 28 receives air (filtered by the engine's air cleaning system) from the bypass 20 and then discharges it into the throttle bore 14 of assembly 12 downstream of throttle valve 18 via a circular array of air outlets 30 defined in body 22.

Figure 4:
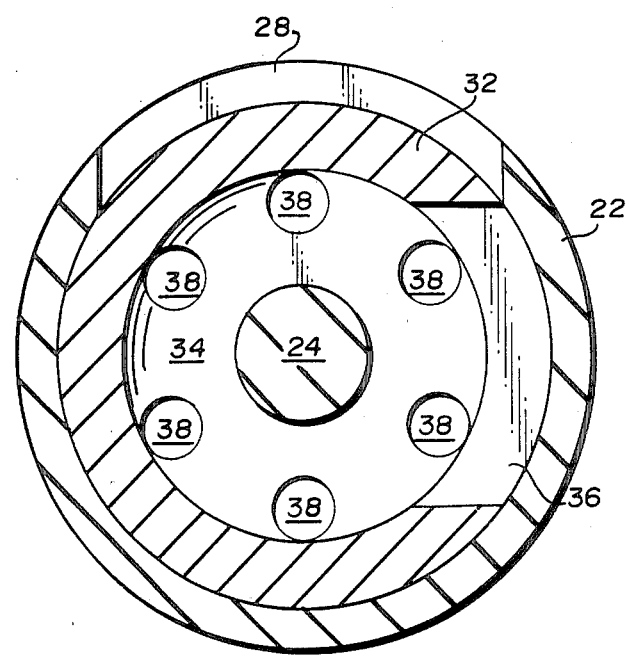
FIG. 4 is a cross-sectional view of the idle valve of this invention taken along line 4—4 in FIG. 2.

A valve spool 32 is mounted within chamber 30 in close fitting relationship (i.e. about 0.001 in. (0.0254 mm.) clearance) relative to valve body 22. The valve spool 32 is generally cylindrical in shape and thus establishes an interior chamber 34. Air inlet and outlet ports 36, 38, respectively, are in communication with interior chamber 34 and are registerable with the similarly configured air inlet 28 and the air outlet openings 30 defined by valve body 22. As shown in FIG. 4, inlet port 36 is preferably in the form of a partial circumferential slot (i.e. similar to inlet 28) while outlet ports 38 are preferably a circular array of openings (i.e. similar to outlet openings 32).

The valve body and valve spool, 22, 32 respectively, are sealed, at least in part, by virtue of the close-fitting relationship therebetween. Also, sealing functions are provided by interdigitated finger and U-shaped flanges 33, 23, respectively, formed on valve spool 32 and valve body 22. The interdigitated flanges 33 and 23 thus from a mechanical labyrinth seal at that end of body 22 having the outlet openings 30.

The valve spool 32 is mounted within valve body 22 for rotational motion about axis 26 by spool bearings 40 and is driven by means of motor 42. Motor 42 is preferably of a high RPM, low torque character which is operable responsive to receiving reverse polarity DC voltage signals from the ECU 44 (see FIG. 1). One such motor may be ESCAP No. 16C11-205-O Micromotor.

The drive output of motor 42 is speed-reduced by a gearing arrangement comprised of a worm 46 and a worm gear 48 housed within an enclosure 50 integrally provided as part of valve body 22. The worm gear 48 includes a male portion 52 which is mated within the valve spool 32 and is mounted for rotational motion via gear bearing 54 associated with the terminal end of bearing post 24. A transverse bore 56 extends through the male portion 52 of the worm gear 48, the purpose of which will be described later.

Figure 5:
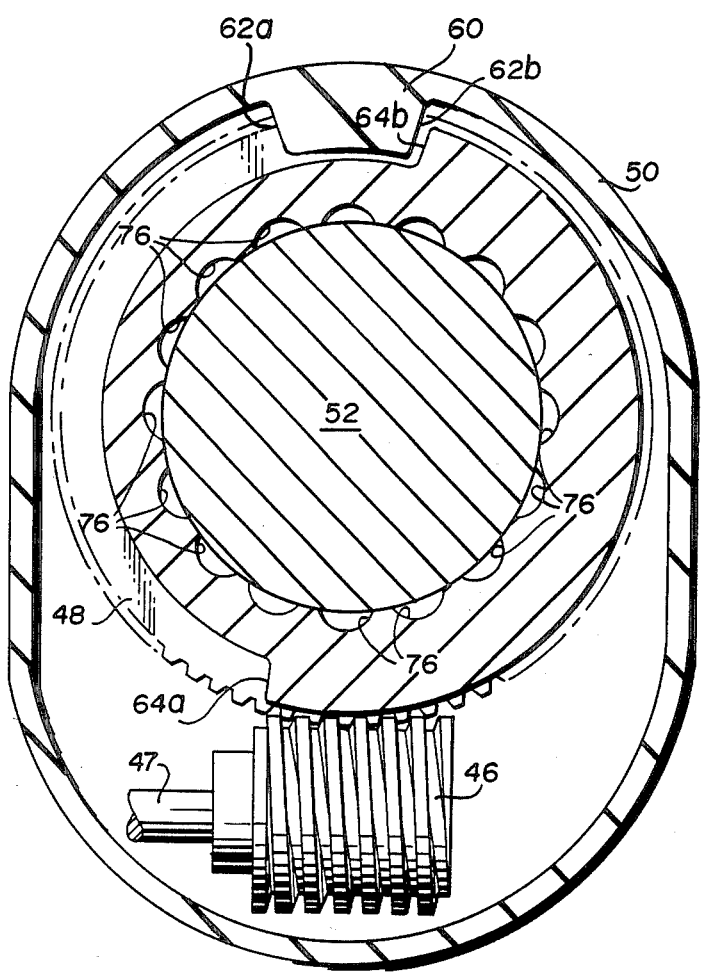
FIG. 5 is a cross-sectional view of the idle valve of this invention taken along line 5—5 in FIG. 2.

As is seen more clearly in accompanying FIG. 5, a spool stop 60 is provided on the interior of the valve body 22 and is defined by lateral stop surfaces 62a, 62b, which respectively contact the spool ring stop surfaces 64a, 64b establishing the maximum and minimum (i.e. closed) positions of the valve spool 32. Thus, upon rotation of worm gear 48 via the driven worm 46, the valve spool will rotate in a direction dependent upon the polarity of the DC voltage signal issued by ECU 44. The valve spool will continue to rotate until reaching its maximum (minimum) position which, in turn, is determined by contact between surfaces 62a and 64a (62b and 64b).

After reaching its maximum (minimum) position, the clutch assembly 70, permits relative slippage to occur between male portion 52 and the valve spool 32. The clutch assembly 70 of this invention thus causes the male portion 58 of the worm gear 48 to be drivenly engaged with the valve spool 32 at torque levels below a predetermined threshold while yet permitting relative slippage therebetween at torque levels in excess of the threshold.

Figure 6:
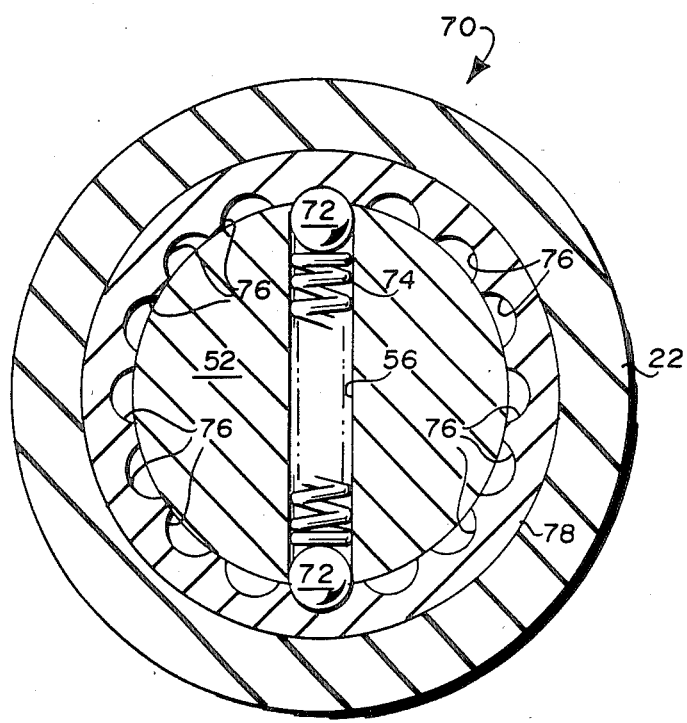
FIG. 6 is a cross-sectional view of the idle valve of this invention taken along line 6—6 in FIG. 2.

As is shown more clearly in FIG. 6, the clutch assembly 70 includes a pair of spherical detent members 72 slidably received within bore 56 at each end thereof with a compression spring 74 located therebetween. A splined surface comprised of a plurality of spline slots 76 is defined on an interior end region 78 of the valve spool 32 so that the detent members 72 are received, and thus engaged therein. Torque is thus transmitted to the valve spool 32 in response to rotation of the worm gear 48 when the detent members 72 are engaged within a corresponding pair of spline slots 76. When, however, a threshold torque level is exceeded (as by the valve spool attaining its maximum (minimum) position), the detent members 72 will be yieldably retracted into bore 56 against the bias force of the compression spring 74 so as to move away from the spline slots 76 and thus permit relative slippage to occur between the male portion 52 of the worm gear 48 and the valve spool 32. In such a manner, the motor 44 may continue to rotate in a direction even after the maximum (minimum) position of the valve spool has been achieved thereby avoiding complicated motor-disabling and/or valve spool position sensing systems and the like.

Upon a DC voltage signal of a polarity reverse of that used to move spool 32 into its maximum (minimum) position being applied to the motor 42 from ECU 44, the torque will fall below the predetermined threshold required for relative slippage to occur between male portion 52 and valve spool 32 since the worm gear 48 is then also rotating in an opposite direction. The compression spring thus urges the detent members 72 into engagement with an opposing pair of spline slots 76 defined by the valve spool 32. In such a manner, torque is again transmitted to spool 32 via detent members 76 so as to drivenly rotate the former.

The threshold torque level above which relative slippage occurs between male portion 52 and valve spool 32 is predetermined, for example, by the depth of spline slots 76 and/or by the force which is exerted upon detent members 72 by means of spring 74.

In operation, when a command signal 44a (see FIG. 1) is issued by the ECU 44 to the DC motor 42 in the form of a DC voltage of a predetermined polarity, the output of the motor 42 will be transferred to the worm 46 via the motor shaft 47 (see FIG. 5) which, in turn, causes the worm gear 48 to rotate in one direction about the longitudinal axis 26 of the valve body 22. This rotation will continue until the ECU 44 stops sending the command signal or the spool ring stop surface 64a (64b) engages the spool stop surface 62a (62b) to establish the maximum (minimum) position of the valve spool 32. This rotation, in turn, controllably alters the maximum (minimum) effective area of the inlet ports 36, 38, respectively, of the valve spool so as to permit a maximum (minimum of air flow through the valve body 22.

Upon reaching its maximum (minimum) position, the clutch assembly will sense that a predetermined threshold torque has been exceeded. Thus, since the motor 42 will continue to operate (and attempt to further rotate spool 32 via worm/worm gear 46/48 beyond its maximum (minimum) position), the detent members 72 will experience a force greater than that exerted upon them by compression spring 74. The detect members 72 will therefore yieldably retract within bore 56 allowing relative slippage to occur as between male portion 52 and valve spool 32. This relative slippage will continue as long as motor 42 attempts to rotate spool 32 (via worm/worm gear 46/48) beyond its maximum (minimum) position.

Upon a DC voltage of a polarity reverse to that previously applied being issued as a signal 44a from ECU 44, the motor 42 will responsively rotate in an opposite direction thereby transmitting this opposite rotation to the valve spool 32. Since the torque level is now less than the threshold torque encountered when the valve spool 32 is in its maximum (minimum) position, the spool 32 will rotate in the opposite direction since the detect members 72 will be urged into engagement, and will remain seated, with an opposing pair of spline slots 76. Of course, when the threshold torque is exceeded as by spool 32 again being rotated into its maximum (minimum) position, the detent members 72 will again be yieldably retracted into the transverse bore 56 against the bias force of the compression spring 74 so that relative slippage will occur between the male portion 52 of the worm gear 48 and the valve spool 32 thereby effectively terminating or preventing further torque from being transmitted therebetween. In such a manner, the valve spool is caused to stop rotating with the advantage being that no damage occurs as between the valve spool 32 and the worm gear/worm 48/46.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An idle control valve for an internal combustion engine, said idle control valve having an air inlet and an air outlet to permit a controllable amount of air to flow therebetween, and including:
   a valve body;
   a valve spool;
   means for mounting said valve spool within said valve body so that said valve spool is rotatable in first and second opposite rotational directions about an axis common to said valve spool and valve body;
   said valve spool and valve body together including valve port means defining an alterable effective area which, in turn, permits an amount of air flowing through said valve body between said air inlet and outlet thereof to be correspondingly alterable;
   drive means for rotating said valve spool about said common axis is said first and second opposite directions for altering said effective area of said port means to thereby responsively controllably alter the amount air flowing through said valve body between said inlet and outlet thereof;
   clutch means for (i) said valve spool at torque levels below a threshold so as to transmit same to, and thus rotate, said valve spool, and (ii) releasing said engagement with said valve spool in response to said threshold torque being exceeded to allow relative slippage to occur between said drive means and said valve spool thereby preventing torque transmission to, and thus rotation of, said valve spool, and seal means for effectively sealing said valve spool and valve body against air leakage, said seal means including,
(i) a generally U-shaped flange rigidly associated with a terminal end of said valve body; and
(ii) a finger flange rigidly associated with said valve spool adjacent said valve body terminal end, wherein
(iii) said finger flange and said U-shaped flange are interdigitated with one another in close fitting relationship so as to collectively establish a mechanical labyrinth seal.

2. An idle control valve as in claim 1, wherein said clutch means includes a splined surface defined by said valve spool, and detent means engageable with said splined surface at torque levels below said threshold yet movable away from said splined surface at torque levels which exceed said threshold.

3. An idle control valve as in claim 2, wherein said detent means includes at least one spherical member, and biasing means acting upon said spherical member to urge the same towards said splined surface yet permitting said spherical member to be yieldably moved away from said splined surface in response to said threshold torque being exceeded thereby releasing said engagement between said drive means and said valve spool.

4. An idle control valve as in claim 2, wherein said clutch means includes a male portion associated with said drive means mated within said valve spool adjacent said splined surface, and a bore extending through said male portion transverse to said common axis, said detent means being positioned in said bore for reciprocal movements towards and away from said splined surface.

5. An idle control valve as in claim 4, wherein said detent means includes a pair of spherical members slidably received within said bore and positioned at respective ends thereof in facing relationship to said splined surface, and biasing means located between, and acting upon, said pair of spherical members for urging each in a direction towards said splined surface.

6. An idle control valve as in claim 5 wherein said biasing means is a compression spring.

7. An idle control valve as in claim 1, wherein said drive means includes a motor, and gear means coupled to said motor for translating the output thereof into said rotational motion of said valve spool.

8. An idle control valve as in claim 7, wherein said motor has an output shaft, and said gear means includes a worm attached to said output shaft and a worm gear intermeshed with said worm and coupled to said spool valve for translating the rotation of said worm into said rotation of said valve spool.

9. An idle control valve for controlling the amount of combustion air delivered to a throttle bore of an internal combustion engine comprising:

a valve body having a generally cylindrical interior chamber and including a circumferentially oriented opening which defines an air inlet for introducing air into said interior chamber and apertures defined in a terminal end of said valve body so as to provide an air outlet adapted to being operatively positioned relative to said throttle bore to discharge air thereinto from said valve body;

valve means for controlling the amount of air introduced into said valve body via said air inlet and discharged therefrom through said air outlet, said valve means including,
(i) a generally cylindrical valve spool
(ii) said valve spool including means defining (1) an inner spool chamber, and (2) air entrance and discharge ports in fluid communication with said inner spool chamber, and
(iii) mounting means for coaxially mounting said valve spool within said interior chamber of said valve body so as to permit said valve spool to be rotated in opposite rotational directions relative to said valve body about a common axis thereof between (a) a maximum position, wherein a maximum of said air entrance and discharge ports of said valve spool are respectively registered with said air inlet and outlet of said valve body to permit a maximum amount of air to be delivered to said throttle bore, and (b) a minimum position, wherein a minimum of said air entrance and discharge ports of said valve spool are respectively registered with said air inlet and outlet of said valve body to permit a minimum amount of air to be delivered to said throttle bore;

drive means engagable with said valve spool for controllably rotating said valve spool in either of said opposite directions between said maximum and minimum positions, and positions intermediate thereof, whereby the amount of air delivered to said throttle bore is controlled; and clutch means for establishing driven engagement between said drive means and said valve spool, and for releasing said driven engagement when a threshold torque level is exceeded, said clutch means including:
(a) spline slots defined on an interior region of said valve spool,
(b) detent means mounted for movements towards and away from said spline slots, and
(c) biasing means for biasing said detent means towards said spline slots so that said detent means engages at least one of said spline slots to establish said driven engagement between said drive means and said valve spool, and for permitting said detent means to be yieldably retracted away from said spline slots responsive to said threshold torque level being exceeded so as to allow relative slippage between said drive means and said valve spool, wherein said drive means includes a male portion slidably mated within said valve spool adjacent said interior region thereof on which said spline slots are defined; and wherein said clutch means includes a bore extending through said male portion, said detent means being positioned in said bore for reciprocal movements towards and away from said spline slots, and, said mounting means includes a central bearing post disposed substantially coaxially within said inner spool chamber and having a proximal end rigidly associated with said valve body terminal end and a distal end which terminates adjacent said male portion, and bearing means for rotatably coupling (1) one end of said valve spool to said bearing post proximal end, and (2) said male portion to said bearing post terminal end.

10. An idle control valve as in claim 9, wherein said valve body and/or said valve spool includes stop means defining said maximum and minimum positions of said valve spool.

11. An idle control valve as in claim 10, wherein said stop means includes a stop associated with said valve body which defines an opposing pair of stop surfaces, and wherein said valve spool defines a pair of engagement surfaces, one and the other of asid engagement surfaces being brought into contact with one and the other of said stop surfaces so as to define the limit of rotation of said valve spool in said one and other rotational directions thereby establishing said maximum and minimum spool positions, respectively.

12. An idle control valve as in claim 9, wherein said detent means includes a pair of spherical members slidably received within said bore, and wherein said biasing means includes a compression spring located between said pair of spherical members and urging each in a direction towards said spline slots.

13. An idle control valve as in claim 9, wherein said drive means includes a motor and means coupled to said motor for translating the output thereof into said rotational motion of said valve spool.

14. The combination comprising a throttle assembly for an internal combustion engine having a throttle bore, and an idle valve connected to said throttle assembly for controllably altering the amount of air introduced into said throttle bore, said idle valve including,
 a valve body having a generally cylindrical interior chamber and including a circumferentially oriented slot which defines an air inlet for introducing air into said interior chamber, and apertures defined in a terminal end of said valve body so as to provide an air outlet adapted to being operatively positioned relative to said throttle bore to discharge air thereinto from said interior chamber;
 valve means for controlling the amount of air introduced into said interior chamber of said valve body via said air inlet and discharged therefrom through said air outlet, said valve means including,
  (i) a generally cylindrical valve spool,
  (ii) means defining in said valve spool an inner spool chamber, and air entrance and discharge ports in fluid communication with said inner spool chamber, and
  (iii) mounting means for coaxially mounting said valve spool within said interior chamber of said valve body so as to permit said valve spool to be rotated relative to said valve body about a common axis thereof between (a) a maximum position, wherein a maximum of said air entrance and discharge ports of said valve spool are respectively registered with said air inlet and outlet of said valve body to permit a maximum amount of air to delivered to said throttle bore, and (b) a minimum position, wherein a minimum of said air entrance and discharge ports of said valve spool are respectively registered with said air inlet and outlet of said valve body to permit a minimum amount of air to be delivered to said throttle bore,
 said idle valve further including;
 drive means engaged with said valve spool for controllably rotating said valve spool between said maximum and minimum positions, and positions intermediate thereof, whereby the amount of air delivered to said throttle bore is controlled; and
 clutch means for establishing driven engagement between said drive means and said valve spool, and for releasing said driven engagement when a threshold torque level is exceeded, said clutch means including:
  (a) spline slots defined on an interior region of said valve spool,
  (b) detent means mounted for movements towards and away from said spline slots, and to release said driven engagement therebetween, and
  (c) biasing means for biasing said detent means towards said spline slots to establish said driven engagement between said drive means and said valve spool and for yieldably permitting said detent means to move away from said spline slots responsive to said threshold torque level being exceeded to release said driven engagement between said driven means and said valve spool, wherein
 said drive means includes a male portion slidably mated within said valve spool adjacent said interior region thereof on which said spline slots are defined; and wherein
 said clutch means includes a bore extending through said male portion, said detent means being positioned in said bore for reciprocal movements towards and away from said spline slots, and,
 said mounting means includes a central bearing post disposed substantially coaxially within said inner spool chamber and having a proximal end rigidly associated with said valve body terminal end and a distal end which terminates adjacent said male portion, and bearing means for rotatably coupling (1) one end of said valve spool to said bearing post proximal end, and (2) said male portion to said bearing post terminal end.

15. The combination as in claim 14, wherein said detent means includes a pair of spherical members slidably received within said bore, and wherein said biasing means includes a compression spring located between said pair of spherical members and urging each towards said spline slots.

16. The combination as in claim 14, wherein said drive means includes a motor and gear means coupled to said motor for translating the output thereof into said rotational motion of said valve spool.

* * * * *